United States Patent [19]
Jang

[11] Patent Number: 5,888,164
[45] Date of Patent: Mar. 30, 1999

[54] HYDRAULIC CONTROL SYSTEM FOR AN AUTOMATIC TRANSMISSION USED IN VEHICLES

[75] Inventor: Jaeduck Jang, Kyungki-do, Rep. of Korea

[73] Assignee: Hyundai Motor Company, Seoul, Rep. of Korea

[21] Appl. No.: 951,156

[22] Filed: Oct. 15, 1997

[30] Foreign Application Priority Data

Oct. 15, 1996 [KR] Rep. of Korea .................. 1996-45880

[51] Int. Cl.$^6$ .................................................. F16H 61/08
[52] U.S. Cl. ............................................................ 475/123
[58] Field of Search ............................. 475/123; 477/131

[56] References Cited

U.S. PATENT DOCUMENTS

| | | | |
|---|---|---|---|
| 5,536,216 | 7/1996 | Jang | 475/123 |
| 5,651,751 | 7/1997 | Jang | 477/131 |
| 5,669,853 | 9/1997 | Jang | 477/131 |
| 5,674,152 | 10/1997 | Lee | 477/131 |

*Primary Examiner*—Dirk Wright

[57] ABSTRACT

A hydraulic control system for an automatic transmission including a plurality of frictional elements associated with respective transmission speeds. The hydraulic control system includes a hydraulic fluid source, a line pressure/reducing pressure producer, a shift controller for controlling a shift mode, a hydraulic controller for converting line pressure fed from the shift controller into duty-controlled drive pressure or duty-controlled reverse pressure to improve shift quality and responsiveness, and a pressure distributer for selectively distributing line pressure from the shift controller and duty-controlled drive or reverse pressure from the pressure controller to each frictional element for each speed ratio while being controlled by line pressure from the shift controller. The pressure distributer includes a control switch valve which supplies duty-controlled drive pressure from the pressure controller to one of frictional elements operated in fourth speed ratios as operating pressure during a shift control, and switches the duty-controlled drive pressure to line pressure from the shift controller after the shift control is completed.

13 Claims, 14 Drawing Sheets

HYDRAULIC CONTROL SYSTEM FOR AN AUTOMATIC TRANSMISSION USED IN VEHICLES

BACKGROUND OF THE INVENTION

1. Field of the Invention

The present invention relates to a hydraulic control system for an transmission used in vehicles.

2. Description of Related Art

Generally, a conventional automatic transmission includes a torque convertor, a multi-stage gear shift mechanism connected to the torque convertor, and a hydraulic control system which selects a gear stage of the gear shift mechanism according to a driving state of the vehicle.

The above hydraulic control system includes a pressure regulator, which regulates hydraulic pressure created in a hydraulic source; manual and automatic shift controllers, which select a shift mode; a hydraulic pressure controller, which controls shift quality and shift response for smoothly selecting a shift mode during shifting; a damper clutch controller, for operating a torque convertor damper clutch; and a hydraulic pressure distributor, which supplies an appropriate amount of hydraulic pressure to each of the frictional elements.

In such a hydraulic control system, according to operations of solenoid valves which are On/Off or duty-controlled by a transmission control unit, the pressure distribution by the hydraulic pressure distributor is varied to operate frictional elements associated with respective speed ratios.

When controlling a shift operation from a one speed ratio to another, a timing between exhaust of hydraulic pressure and supply of hydraulic pressure to a new set of frictional elements to shift into another speed ratio affects shift quality.

If the timing is not precise, engine RPM may abruptly increases or the shift mechanism may lock.

Therefore, to precisely control the timing, a very complicated control system has been used.

SUMMARY OF THE INVENTION

Therefore, the present invention has been made in an effort to solve the above problems.

In is an object of the present invention to provide a hydraulic control system which can improve shift quality and responsiveness.

To achieve the above object, the present invention provides a hydraulic control system for an automatic transmission including a plurality of frictional elements associated with respective transmission speeds, the hydraulic control system comprising: a hydraulic fluid source; line pressure/reducing pressure producing means for regulating hydraulic fluid produced in the hydraulic fluid source to line pressure and for reducing part of the line pressure; shift control means for controlling shift mode; said shift control means being supplied with line pressure from line pressure/reducing pressure producing means; hydraulic control means for converting line pressure fed from the shift control means into duty-controlled drive pressure or duty-controlled reverse pressure to improve shift quality and responsiveness, said hydraulic control means being supplied with the reduced line pressure from said line pressure/reducing pressure producing means as control pressure; and pressure distributing means for selectively distributing line pressure from the shift control means and duty-controlled drive or reverse pressure from the pressure control means to each frictional element for each speed ratio while being controlled by line pressure from the shift control means. The pressure distributing means comprises a control switch valve which supplies duty-controlled drive pressure from the pressure control means to one of frictional elements operated in fourth speed ratios as operating pressure during a shift control, and switches the duty-controlled drive pressure to line pressure from the shift control means after the shift control is completed, said control switch valve being controlled by line pressure supplied from the shift control means in accordance with an operation of a solenoid valve which is on/off controlled by a transmission control unit.

The pressure distributing means further comprises:

a 1-2 shift valve for controlling a supply direction of duty-controlled reverse and drive pressures produced by the pressure control means, said 1-2 shift valve being controlled by line pressure from the shift control means;

a 4-2 shift valve for selectively supplying line pressure and duty-controlled drive pressure from the control switch valve to frictional elements which are operated in first, second and third speed ratios;

a 2-3/4-3 shift valve for selectively supplying line pressure from the shift control means and duty-controlled reverse pressure from the pressure control means to frictional elements which are operated in a third speed ratio and a reverse range, said 3-4 shift valve being controlled by line pressure from the shift control means; and a 3-4 shift valve for supplying duty-controlled drive pressure from the pressure control means to a frictional element which is operated in the first, second and third speed ratios, said 3-4 shift valve being controlled by line pressure from the shift control means and feeding this line pressure to the 2-3/4-3 shift valve as control pressure.

The 1-2 shift valve comprises a first port for receiving control pressure from the shift control means; a second port for receiving hydraulic pressure duty-controlled by the pressure control means, a third port for receiving reverse pressure duty controlled by the pressure control means, a fourth port for simultaneously supplying the duty controlled pressure to the 2-3/4-3 shift valve and the control switch valve, and a fifth port for supplying the reverse pressure to the frictional element which is operated in the reverse range.

The control switch valve comprises a first port for receiving line pressure from the shift control means as control pressure, a second port for supplying line pressure coming through the first port to the 4-2 shift valve, a third port for receiving line pressure from the shift control means, a fourth port for receiving duty-controlled drive pressure controlled by the pressure control means through the 1-2 shift valve, a fifth port for supplying line pressure coming through the third port or duty-controlled drive pressure coming through fourth ports to one of frictional elements in the second, third and fourth speed ratios as operating pressure, a sixth port for supplying duty-controlled drive pressure coming through the fourth port to the 4-2 shift valve, a seventh port for receiving line pressure from the shift control means, and an eighth port for directing line pressure coming through the seventh port to the 4-2 shift valve.

The control switch valve further comprises a ninth port communicating with a first line branched off from a second line communicating with the seventh port, and a check valve that interrupts hydraulic pressure being directed to the control switch valve, said check valve being mounted on the first line.

The 4-2 shift valve comprises a first port for receiving part of duty-controlled drive from the 3-4 shift valve, a second port for receiving line pressure from the control switch valve as control pressure, a third port for receivig line pressure or duty-controlled drive pressure from the control switch valve, a fourth port for receiving line pressure from the control switch valve, and a fifth port for selectively supplying line pressure and duty-controlled drive pressure coming through the third and fourth ports to a frictional element operated in the third and fourth speed ratios.

The 2-3/4-3 shift valve comprises a first port for receiving line pressure from the shift control means as control pressure, a second port connected to the 3-4 shift valve to receive line pressure therefrom, a third port connected to a frictional element for the third speed ratios, a fourth port for receiving line pressure from the 3-4 shift valve and feeding line pressure to the frictional element for the third speed through the third port, and a fifth port for receiving duty-controlled drive pressure from the pressure control means via the 1-2 shift valve.

The 3-4 shift valve comprises a first port for receiving line pressure from the shift control means, a second port for supplying line pressure coming through the first port to the second port of the 2-3/4-3 shift valve as control pressure, a third port for receiving duty-controlled drive pressure from the second pressure control valve, a fourth port for supplying duty-controlled drive pressure coming through the third port to the frictional element for first, second and third speed ratios, and fifth and sixth ports for receiving line pressure from the shift control means.

A circulating line is branched off and communicating with a first line connected to the sixth port of the 3-4 shift valve, the fifth port being connected to a second line branched off from the circulating line and the second line extending to the 2-3/4-3 shift valve.

The line pressure/reducing pressure producing means comprises a pressure regulating valve for regulating hydraulic fluid produced in the hydraulic fluid source to line pressure and a reducing valve for reducing part of the line pressure.

The shift control means comprises a manual valve for selecting a shift mode, said manual valve being connected to the pressure regulating valve to be supplied with line pressure therefrom, and a shift control valve for receiving line pressure from the manual valve and supplying line pressure to the pressure dispensing means as operating pressure and control pressure.

The pressure control means comprises a N-R control valve for receiving line pressure reduced in the reducing pressure as control pressure and line pressure from the manual valve as line pressure and for supplying line pressure to the pressure dispensing means as reverse pressure, and a first pressure control valve for receiving line pressure reduced in the reducing pressure as control pressure and line pressure from the manual valve and for supplying line pressure to the pressure dispensing means as operating pressure, and a second pressure control valve for receiving line pressure reduced in the reducing pressure as control pressure and line pressure from the manual valve and for supplying line pressure to the pressure dispensing means.

The pressure control means is controlled by first and second duty-controlled solenoid valves.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENT

Reference will now be made in detail to the present preferred embodiment of the invention, an example of which is illustrated in the accompanying drawings. Wherever possible, the same reference numbers will be used throughout the drawings to refer to the same or like parts.

Certain terminology will be used in the following description for convenience and reference only and will not be limiting. The words "line pressure" indicate pressure regulated by a pressure regulating valve which will be described hereinafter more in detail, the words "control pressure" indicate pressure for controlling operation of each valve, the words "duty controlled reverse or drive pressure" indicate pressure which is controlled by the pressure control part, and the words "reducing pressure" indicate pressure which is reduced by a reducing valve.

Control System Components and Their Interconnection

Figure 1:
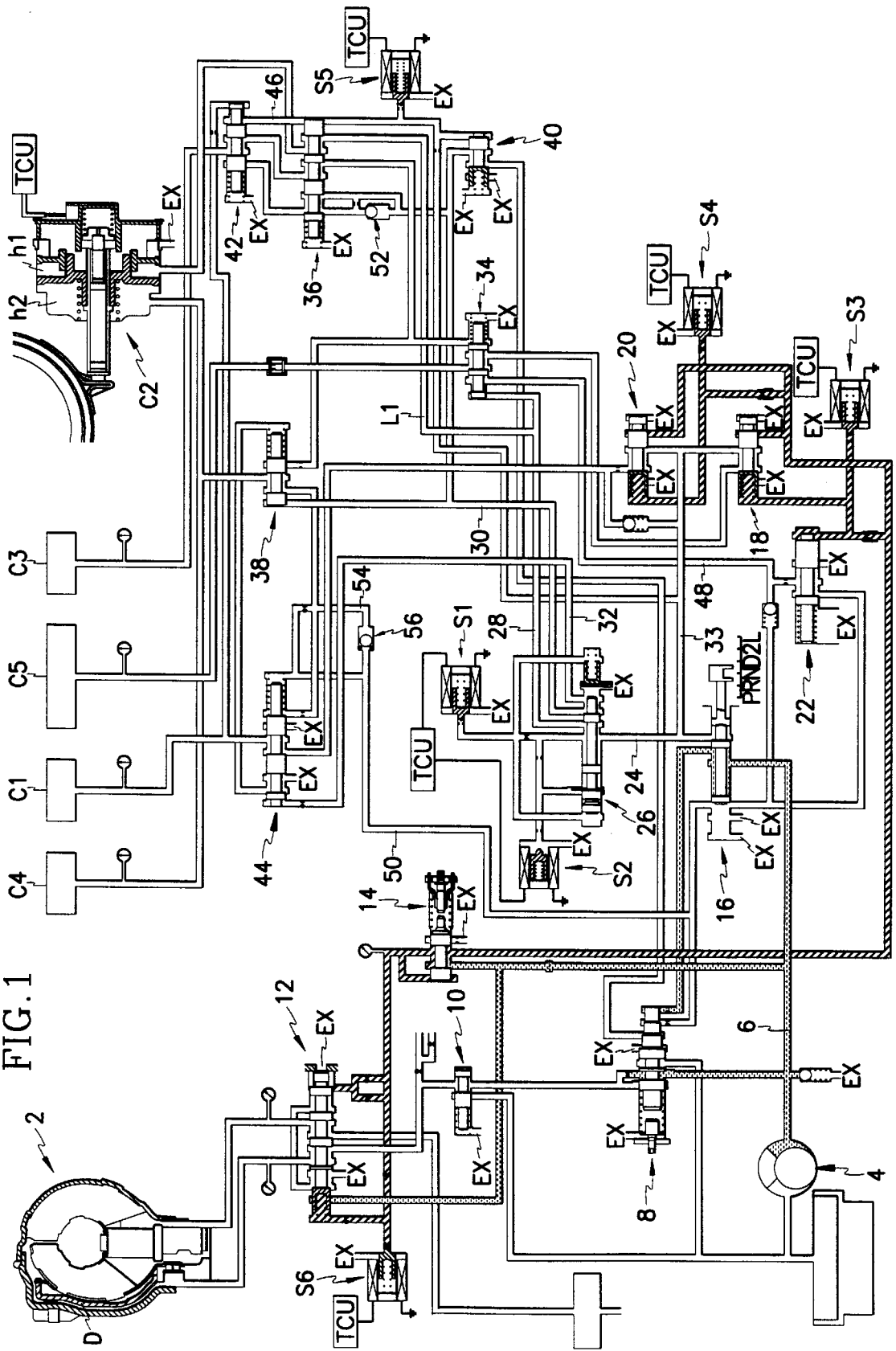
FIG. 1 is a hydraulic circuit diagram illustrating a hydraulic pressure flow state in a neutral "N" range of the hydraulic control system according to a preferred embodiment of the present invention.

Referring to FIG. 1, a hydraulic control system of the present invention comprises a torque converter 2 which receives power from an engine, and converts and transmits the power to the automatic transmission, and a hydraulic pump 4 for generating line pressure.

The hydraulic control system also includes a pressure regulating valve 8 for converting hydraulic fluid generated by the hydraulic pump 4 into constant line pressure, a torque converter control valve 10 for controlling line pressure to a fixed level for the torque converter 2, and a damper clutch control valve 12 for controlling the operation of a damper clutch D in the torque converter 2 to increase the power transmission efficiency of the torque converter 2.

The hydraulic control system further includes a reducing valve 14 for reducing line pressure and a manual valve 16, the position of which is controlled via a shift selector lever (now shown) by the driver, the manual being supplied with line pressure.

The hydraulic control system further includes first and second pressure control valves 18 and 20 which are supplied with hydraulic pressure reduced by the reducing valve 14 as control pressure, and an N-R control valve 22 for alleviating shift shock occurring when shifting from a neutral "N" range to a reverse "R" range, the N-R control valve being supplied with part of hydraulic pressure from the reducing valve 14 as control pressure.

The hydraulic control system further includes a shift control valve 26 connected to the manual valve 16 through a line 24 when the manual valve is displaced to either a drive "D", second "2", or low "L" range. The shift control valve 26 is controlled by first and second solenoid valves S1 and S2 which are on/off-controlled by a transmission control unit.

The shift control valve 26 is connected to 1-2, 2-3/4-3, and 3-4 shift valves 44, 38 and 44 through second, third and fourth speed lines 28, 30 and 32, respectively, so as to supply control pressure thereto.

A first speed line 33 is branched off from the line 24 and is connected to both the first and second pressure control valves 18 and 20 so as to supply line pressure thereto. The first and second pressure control valves 18 and 20 are controlled by the reduced pressure from the reducing valve 14 in accordance with the operation of the third and fourth solenoid valves S3 and S4, respectively.

Part of line pressure flowing along the second speed line 28 is directed to an engaging chamber h1 of a second frictional element C2 via the control switch valve 36.

Part of line pressure flowing along the third speed line 30 is, through a line branched off from the third speed line 30, supplied to a high-low pressure valve 40 for reducing driving loss of the hydraulic pump 4 by reducing line pressure at high speeds and is further supplied to a third frictional element C3 via the control switch valve 36 and the 4-2 shift valve 42.

A timing control line 46 is branched off from the first speed line 33 such that line pressure flowing along the first speed line 33 can be supplied to the 4-2 shift valve 42 via the control switch valve 36.

The N-R control valve 22 designed to be supplied with line pressure from the manual valve 16 when the manual valve 16 is set at the reverse "R" range. Line pressure fed to the N-R control valve 22 is controlled to drive pressure which is to be directed to a fifth frictional element C3, acting as a reacting element in a reverse range, along a reverse control line 48. Further, in the reverse range, line pressure of the manual valve 16 fed to both a fourth frictional element C4 and a disengaging chamber h2 of the second frictional element C2 via the 3-4 shift valve 44 and the 2-3/4-3 shift valve 38 through the reverse second line 50.

The 1-2 shift valve 34 is controlled by line pressure fed from the shift control valve 26 through the second speed line 28 such that duty-controlled drive pressure controlled by the first pressure control valve 18 is directed to the engaging chamber h1 of the second frictional element C2 via the control switch valve 36 or to the disengaging chamber h2 of the same and the fourth frictional element C4 via the 2-3/4-3 shift valve 38.

In the reverse "R" range, the 1-2 shift valve 34 is controlled such that drive pressure flowing along the first control line 48 from the N-R control valve 22 is directed to the fifth frictional element C5.

For the above, the 1-2 shift valve 34 is provided with a first port for receiving control pressure from the shift control valve 26 in second, third and fourth speed ratios of the drive "D" range, a second port for receiving hydraulic pressure controlled by the first pressure control valve 18, a third port for receiving reverse pressure from the manual valve 16 in the reverse "R" range, a fourth port for simultaneously supplying the control pressure to the 2-3/4-3 shift valve 38 and the control switch valve 36, and a fifth port for supplying the reverse pressure to the fifth frictional element C5.

The control switch valve 36 and the 4-2 shift valve 42 are controlled such that duty-controlled drive pressure is fed from the first pressure control valve 18 to the third frictional element C3 or exhausted from the same in third and fourth speed ratios.

There is provided timing control means for controlling supply timing of hydraulic pressure to the frictional element C3 and for controlling control timing of the frictional element C2 which acts as a reacting element in second and fourth speed ratios.

The timing control means comprises a fifth solenoid valve S5 which is on/off-controlled by the transmission control unit. The fifth solenoid valve S5 controls the control switch valve 36 such that the control switch valve 36 can switch line pressure fed to the second and third frictional elements C2 and C3 to duty-controlled drive pressure, and vice versa.

Figure 1A:
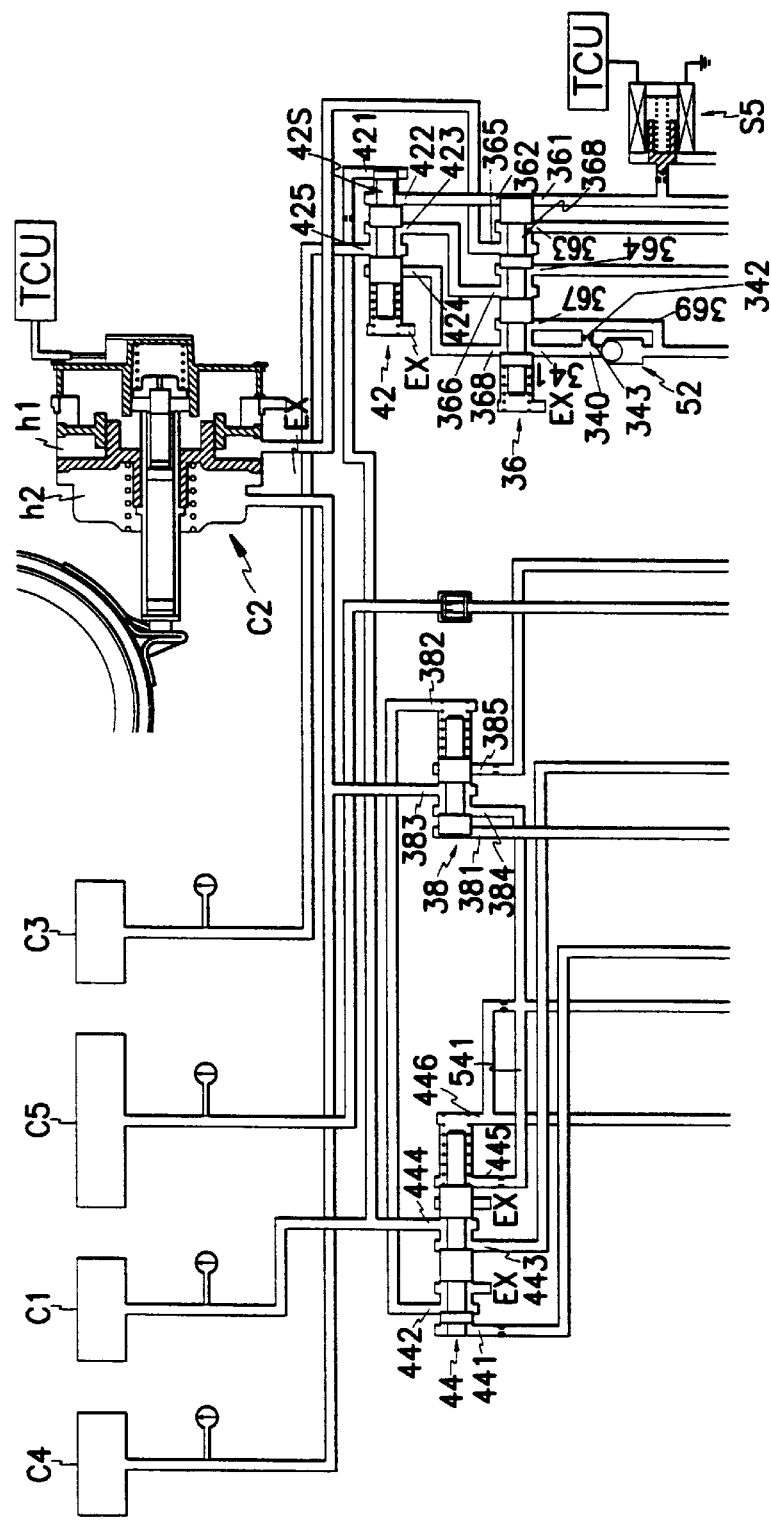
FIG. 1A is an enlarged view illustrating a major portion of the hydraulic control system in FIG. 1.

For the above, as shown in FIG. 1A, the control switch valve 36 comprises a first port 361 for receiving line pressure from the manual valve 16 through the first speed line 33 as control pressure, a second port 362 for supplying line pressure coming through the first port 361 to the 4-2 shift valve 42, a third port 363 for receiving line pressure from the shift control valve 26 through the second speed line 28, a fourth port 364 for receiving duty-controlled drive pressure controlled by the first pressure control valve 18 through the 1-2 shift valve 34, a fifth port 365 for supplying line pressure through the third port 363 or duty-controlled drive pressure coming through fourth port 364 to the engaging chamber h1 of the second frictional element h1, a sixth port 366 for supplying duty-controlled drive pressure coming through the fourth port 364 to the third frictional element C3 via the 4-2 shift valve 42, a seventh port 367 for receiving line pressure from the shift control valve 26 through the third speed line 30, and an eighth port 368 for directing line pressure coming through the seventh port to the third frictional element C3 via the 4-2 shift valve 42. The control switch valve 36 comprises a valve spool 36S for converting the ports. Line pressure being directed to the first port 361 of the control switch valve 36 is controlled by the fifth solenoid valve S5 which is controlled to an ON state only during the shift operation.

A line 340 is branched off from a line 369 connected to the seventh port 367, the line 340 being connected to the control switch valve 36 through a ninth port 341 thereof. A check valve 52 that interrupts hydraulic pressure being directed to the control switch valve 36 is mounted on the line 340. The lines 340 and 369 are connected to each other by a connecting line 342, and an orifice 343 is formed on the connecting line 342. This is for delaying the exhaust of hydraulic pressure from the third frictional element C3.

In addition, the 4-2 shift valve 42 is designed to be controlled by the fifth solenoid valve S5 and hydraulic pressure being directed to the first frictional element C1 so as to selectively supply line pressure and duty-controlled drive pressure, both of which are fed from the control switch valve 36, to the third frictional element C3.

For the above, the 4-2 shift valve 42 comprises a first port 421 for receiving part of duty-controlled drive pressure directed to the first frictional element C1, a second port 422 for receiving line pressure from the second port 362 of the control switch valve 36 as control pressure, a third port 423 for receivig line pressure or duty-controlled drive pressure from the sixth port 366 of the control switch valve 366, a fourth port 424 for receiving line pressure from the eighth port 368 of the control switch valve 36, and a fifth port 425 for selectively supplying line pressure and duty-controlled drive pressure coming through the third and fourth ports 423 and 424 to the third frictional element C3. The port conversion of the 4-2 shift valve 42 is realized by a valve spool 42S.

The 2-3/4-3 shift valve 38 is designed to be controlled by line pressure fed from the shift control valve 26 through the line 30 and line pressure fed from the 3-4 shift valve 44 so as to selectively supply duty-controlled drive pressure fed from the first pressure control valve 18 via the 1-2 shift valve 34 and line pressure fed from the manual valve 16 via the 3-4 shift valve 44 to both the fourth frictional element C4 and the engaging chamber h2 of the second frictional element C2.

For the above, the 2-3/4-3 shift valve 38 comprises a first port 381 for receiving line pressure from the shift control valve 26 through the third speed line 30 as control pressure, a second port 382 connected to the 3-4 shift valve 44 to receive line pressure therefrom, a third port 383 connected to both the disengaging chamber h2 of the second frictional element C2 and the fourth frictional element C4, a fourth port for receiving line pressure from the 3-4 shift valve 44 and feeding line pressure to the disengaging chamber h2 and the fourth frictional element C4 through the third port 383, and a fifth port 385 for receiving duty-controlled drive pressure from the first pressure control valve 18 via the 1-2 shift valve 34.

The 3-4 shift valve 44 is designed to supply duty-controlled drive pressure from the second pressure control valve 20 to the first frictional element C1 in the first, second and third speed ratios, and exhaust hydraulic pressure fed to the first frictional element C1 when shifting from the third speed ratio to the fourth speed ratio, exhaust hydraulic pressure fed to the disengaging chamber h2 of the second frictional element C2 and to the fourth frictional element C4 through the manual valve 16 via the 2-3/4-3 shift valve 38 and the reverse second control line 50 when shifting from the third speed ratio to the fourth speed ratio or from the third speed ratio to the second speed ratio.

To achieve this, the 3-4 shift valve 44 comprises a first port 441 for receiving line pressure from the shift control valve 26 through the fourth speed line 32, a second port 442 for supplying line pressure coming through the first port 441 to the second port 382 of the 2-3/4-3 shift valve 38 as control pressure, a third port 443 for receiving duty-controlled drive pressure from the second pressure control valve 20, a fourth port 444 for supplying duty-controlled drive pressure coming through the third port 443 to both the first frictional element C1 and the first port 421 of the 4-2 shift valve 42, and fifth and sixth ports 445 and 446 connected to the manual valve 16 through the reverse second control line 50.

In the above structure, a circulating line 54 is branched off to communicate with the line 50 connected to the sixth port 446 of the 3-4 shift valve 44, the fifth port 445 being connected to a line 541 branched off from the circulating line 54 and the line 541 extending to the fourth port 384 of the 2-3/4-3 shift valve 38. A check valve 56 for interrupting hydraulic pressure directed toward the line 50 is mounted on the circulating line 54 so as to control the exhausting pressure.

The high-low pressure valve 40 is designed to be controlled by line pressure flowing along the timing control line 46 and to supply line pressure flowing along the third speed line 30 to the pressure regulating valve 8 as control pressure in the third and fourth speed ratios, thereby preventing line pressure from being unnecessarily increased and a reduction in power loss.

The high-low pressure valve 40 decreases line pressure when the fifth solenoid valve S5 is controlled to an off state. That is, the high-low pressure valve 40 is designed to be independently controlled, such that line pressure can be more effectively controlled.

Reference numeral S6 which is not disclosed in the above indicates a sixth solenoid valve for controlling the damper clutch control valve 12 which controls the operation of a damper clutch D.

The operation of the hydraulic control system as described above will be described hereinafter.

In the neutral "N" range, as shown in FIG. 1, hydraulic fluid produced by the hydraulic pump 4 is regulated to constant line pressure by the pressure control valve 8 and is reduced while passing through the reducing valve 14. The reduced pressure is then supplied to the damper clutch valve 12 as control pressure and the first and second pressure control valves 18 and 20 as control pressure.

At this point, the third and fourth solenoid valves S3 and S4 are duty-controlled to off states by the transmission control unit such that the third and fourth pressure control valves 18 and 20 are controlled as shown in FIG. 1.

Figure 2:
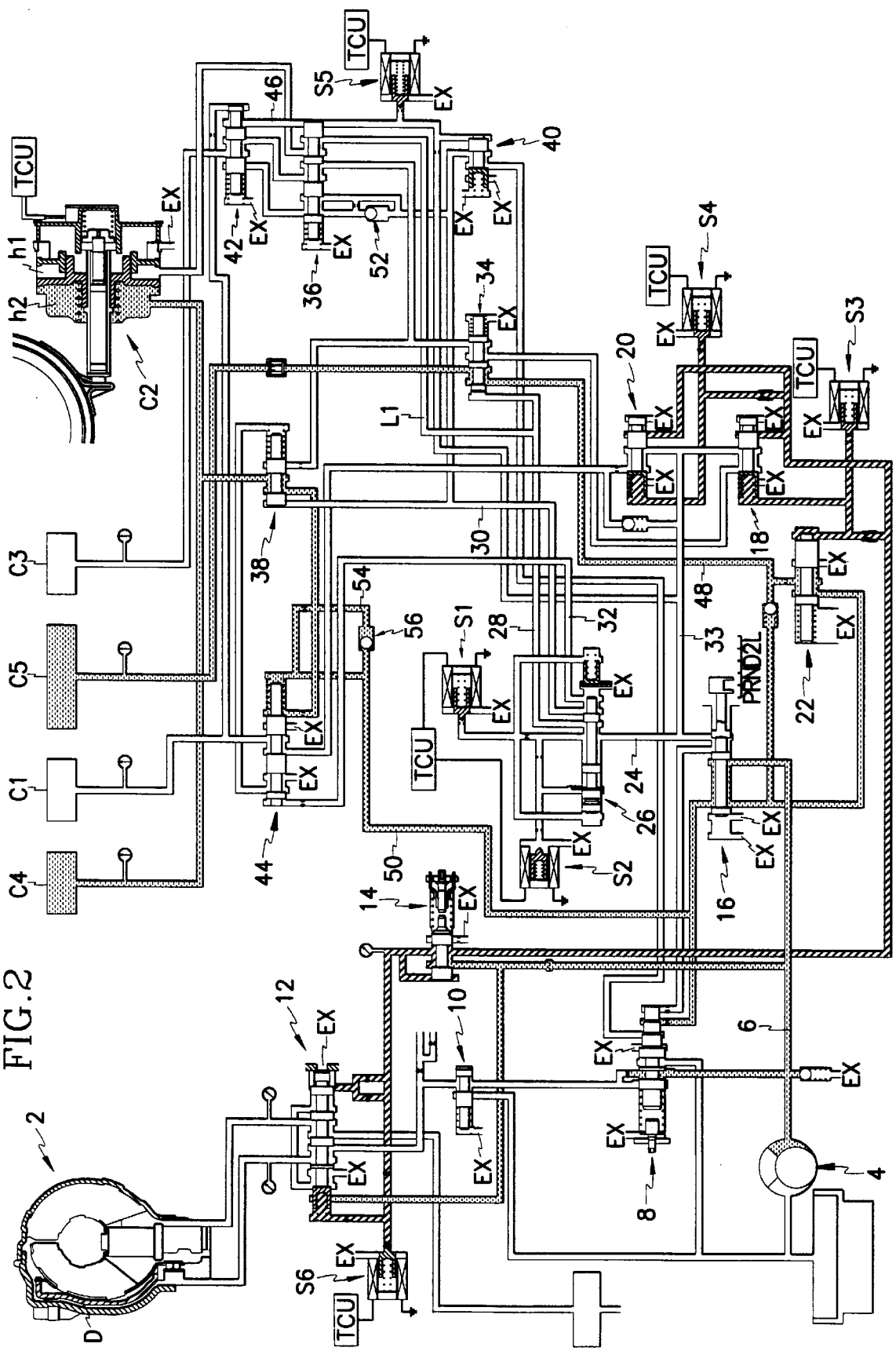
FIG. 2 is a hydraulic circuit diagram illustrating a hydraulic pressure flow state in a reverse "R" range of the hydraulic control system according to a preferred embodiment of the present invention.

In this neutral range state, when the selector lever (not shown) is set at the reverse "R" range, the manual valve 16 comes to be positioned in the same range as shown in FIG. 2. Accordingly, part of the line pressure directed to the manual valve 16 is supplied to the N-R control valve 22. Line pressure fed to the N-R control valve 22 is controlled to duty-controlled drive pressure and is then directed to the fifth frictional element C5, which acts as a reacting element in the reverse "R" range, via the 1-2 shift valve 34. The N-R control valve 22 is controlled by the reduced pressure from the reducing valve 14 in accordance with the operation of the third solenoid valve S3.

In addition, part of the line pressure directed to the manual valve 16 is supplied to both the fourth frictional element C4 and the engaging chamber h1 of the second frictional element C2 via the 3-4 shift valve 44 and the 2-3/4-3 shift valve 38, thereby completing the reverse control. When the reverse control is completed, duty-controlled drive pressure fed to the fifth frictional element C1 is increased to line pressure.

Figure 3:
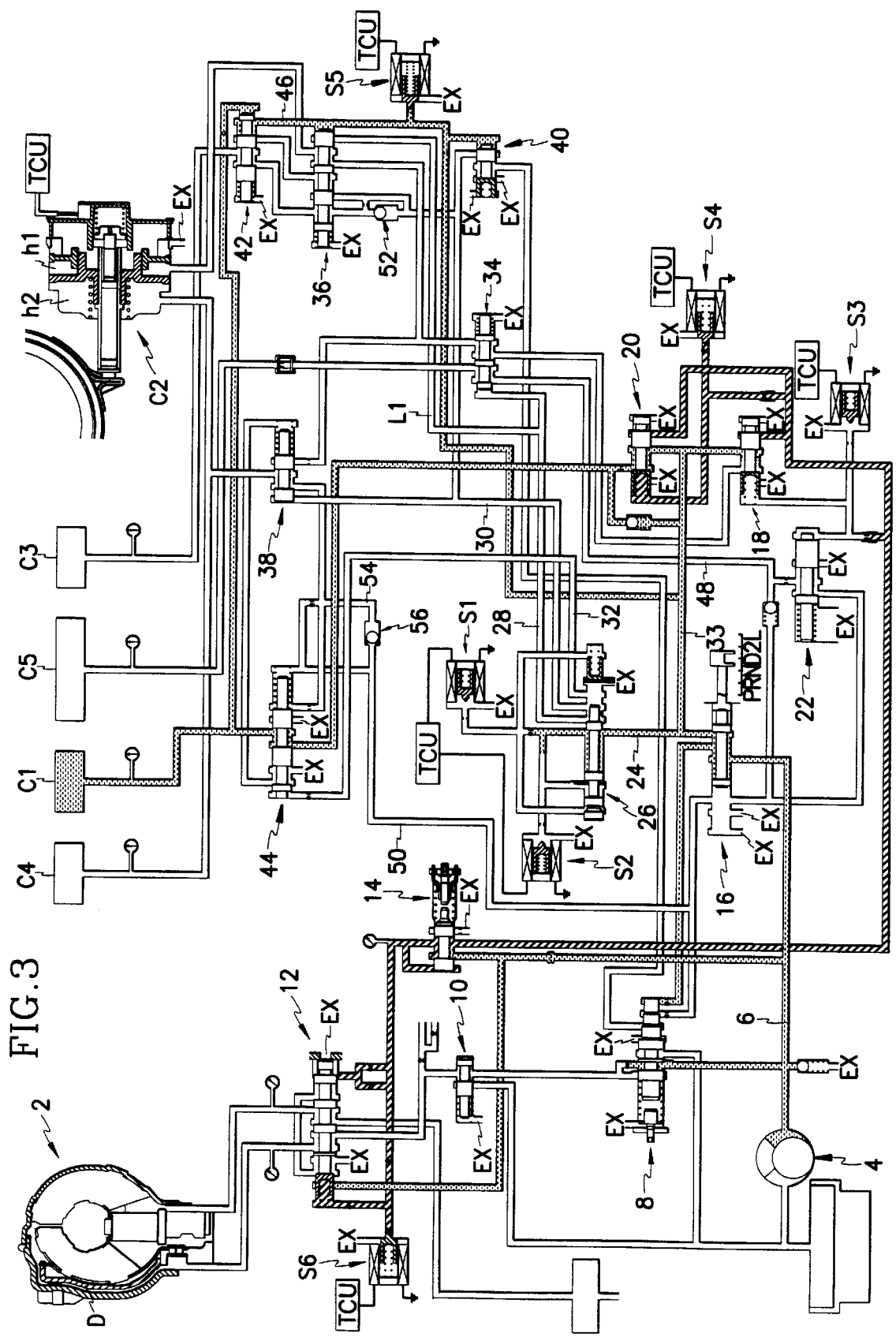
FIG. 3 is a hydraulic circuit diagram illustrating a hydraulic pressure flow state in a first speed ratio of a drive "D" range of the hydraulic control system according to a preferred embodiment of the present invention.

When the selector lever is shifted to the drive "D" range, the manual valve 16 is positioned at the same range as shown in FIG. 3 such that part of the line pressure directed to the manual valve 16 is supplied to the shift control valve 26 and the first and second pressure control valves 18 and 20.

At this point, the first and second solenoid valves S1 and S2 are controlled to on states.

In addition, since line pressure directed toward the first pressure control valve 18 through the first speed line 33 is interrupted as the third solenoid valve S3 is controlled to the on state, and line pressure directed to the second pressure control valve 20 is controlled to duty-controlled drive pressure and supplied to the first frictional element C1 via the second pressure control valve 20 and the 3-4 shift valve 44, the first speed ratio control is completed. When the third speed ratio control is completed, duty-controlled drive pressure fed to the first frictional element C1 is increased to line pressure.

Figure 4:
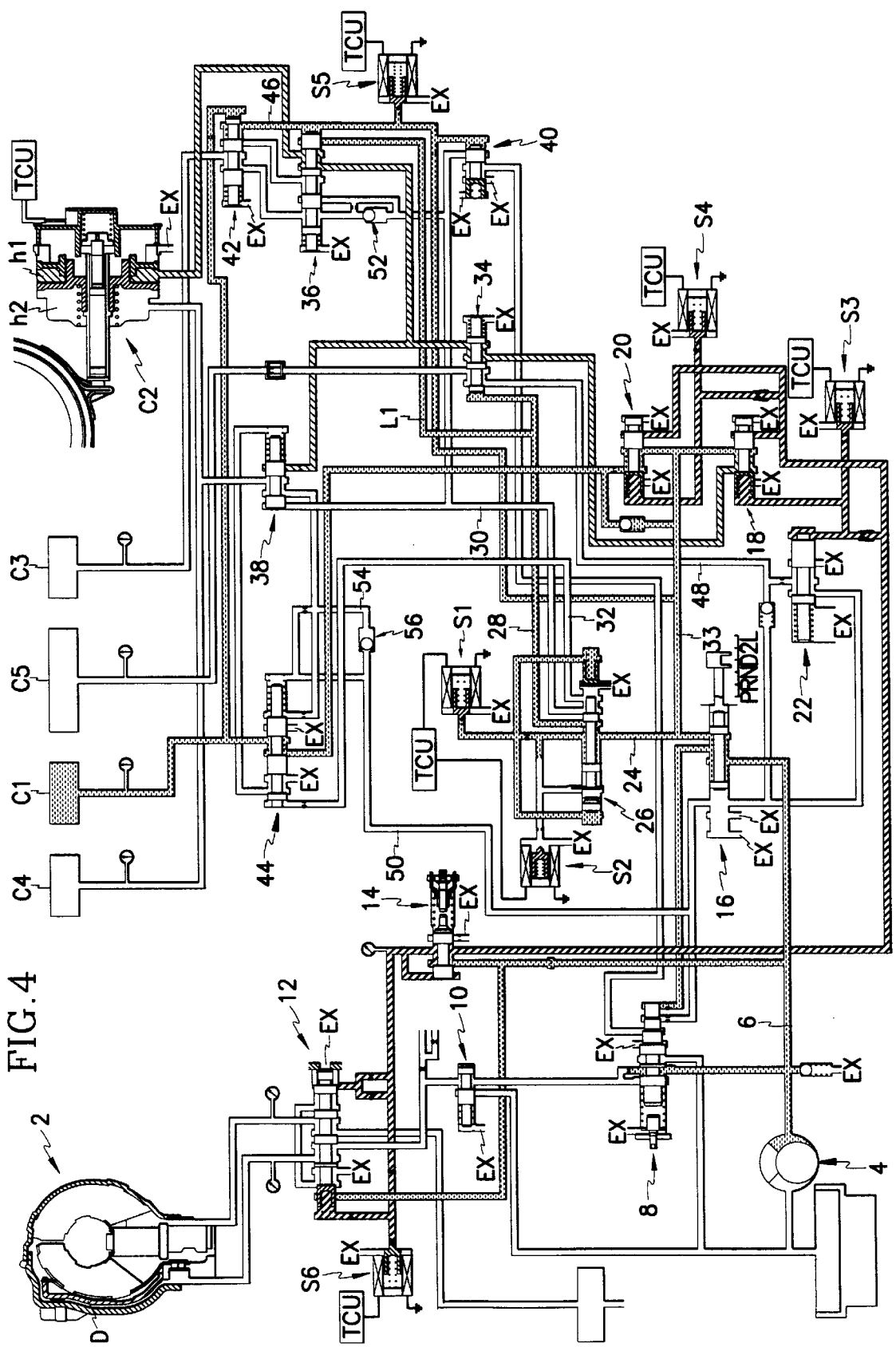
FIG. 4 is a hydraulic circuit diagram illustrating a hydraulic pressure flow state when upshifting from a first a speed ratio to a second speed ratio in a drive "D" range of the hydraulic control system according to a preferred embodiment of the present invention.

As vehicle speed and throttle opening increase in the first speed ratio, as shown in FIG. 4, the transmission control unit controls the first solenoid valve S1 to an off state so as to supply line pressure fed to the shift control valve 26 to the second speed line 28.

In addition, as the third solenoid valve S3 is duty-controlled to an off state, line pressure fed from the first speed line 33 to the first pressure control valve 18 is controlled to the drive pressure. This duty-controlled drive pressure is directed to the engaging chamber h1 of the second frictional element C2 via the 1-2 shift valve 34 and the control switch valve 36.

At this point, part of the duty-controlled drive pressure passing through the 1-2 shift valve 34 is directed to the 2-3/4-3 shift valve 38 to remain standing by at the same, and part of the line pressure is fed from the shift control valve 26 to the control switch valve 36 through a line L1 branched off from the second speed line 28 and remains standing by at the control switch valve 36.

Figure 5:
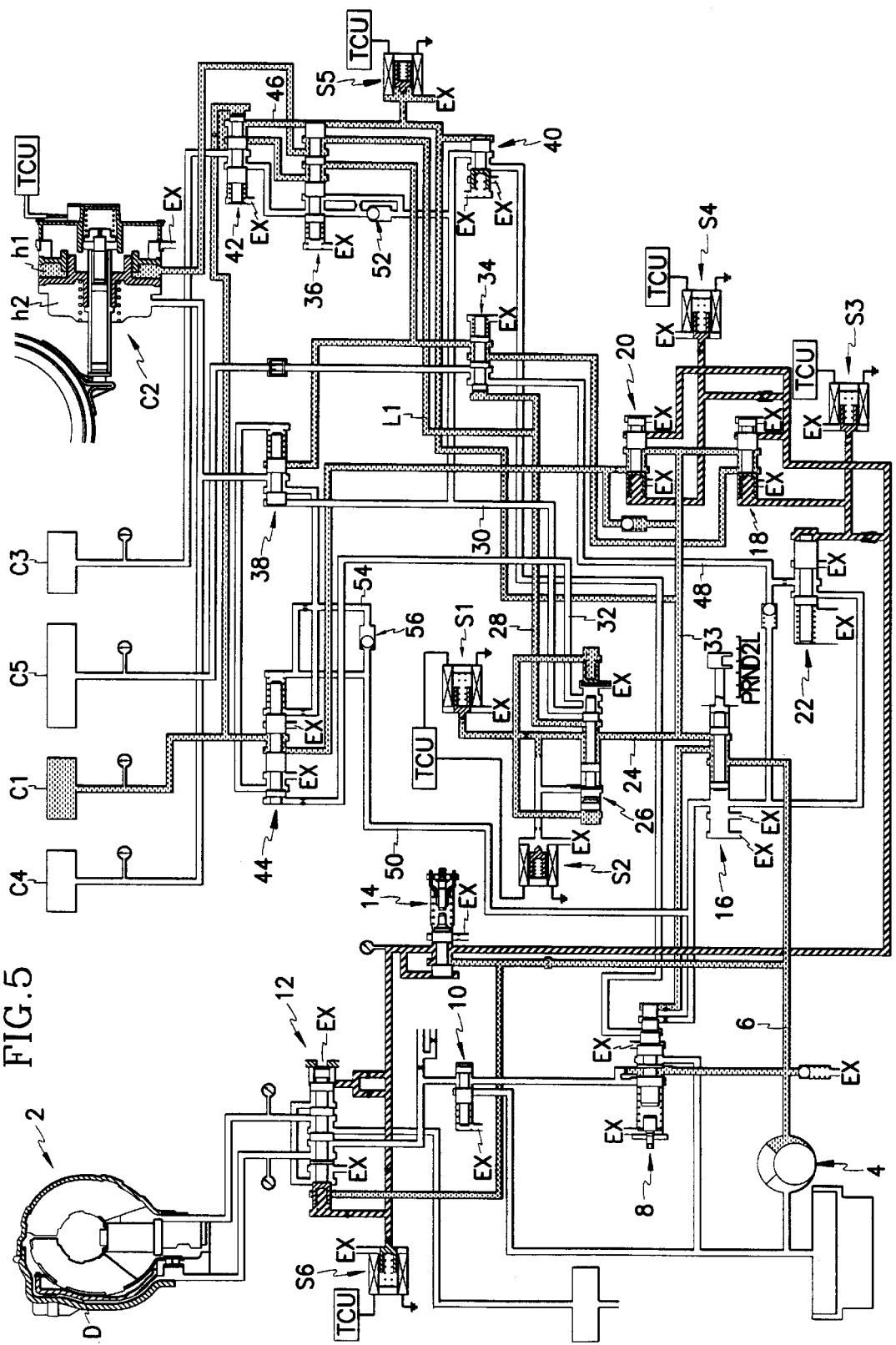
FIG. 5 is a hydraulic circuit diagram illustrating a hydraulic pressure flow state in a second speed ratio of a drive "D" range of the hydraulic control system according to a preferred embodiment of the present invention.

In this state, as shown in FIG. 5, when the third solenoid valve S3 is controlled to an off state, the control switch valve 36 is controlled such that duty-controlled drive pressure fed to the engaging chamber h1 of the second frictional element C2 is switched to line pressure fed from second shift valve 26 through the line L1, thereby completing the second speed ratio control.

Figure 6:
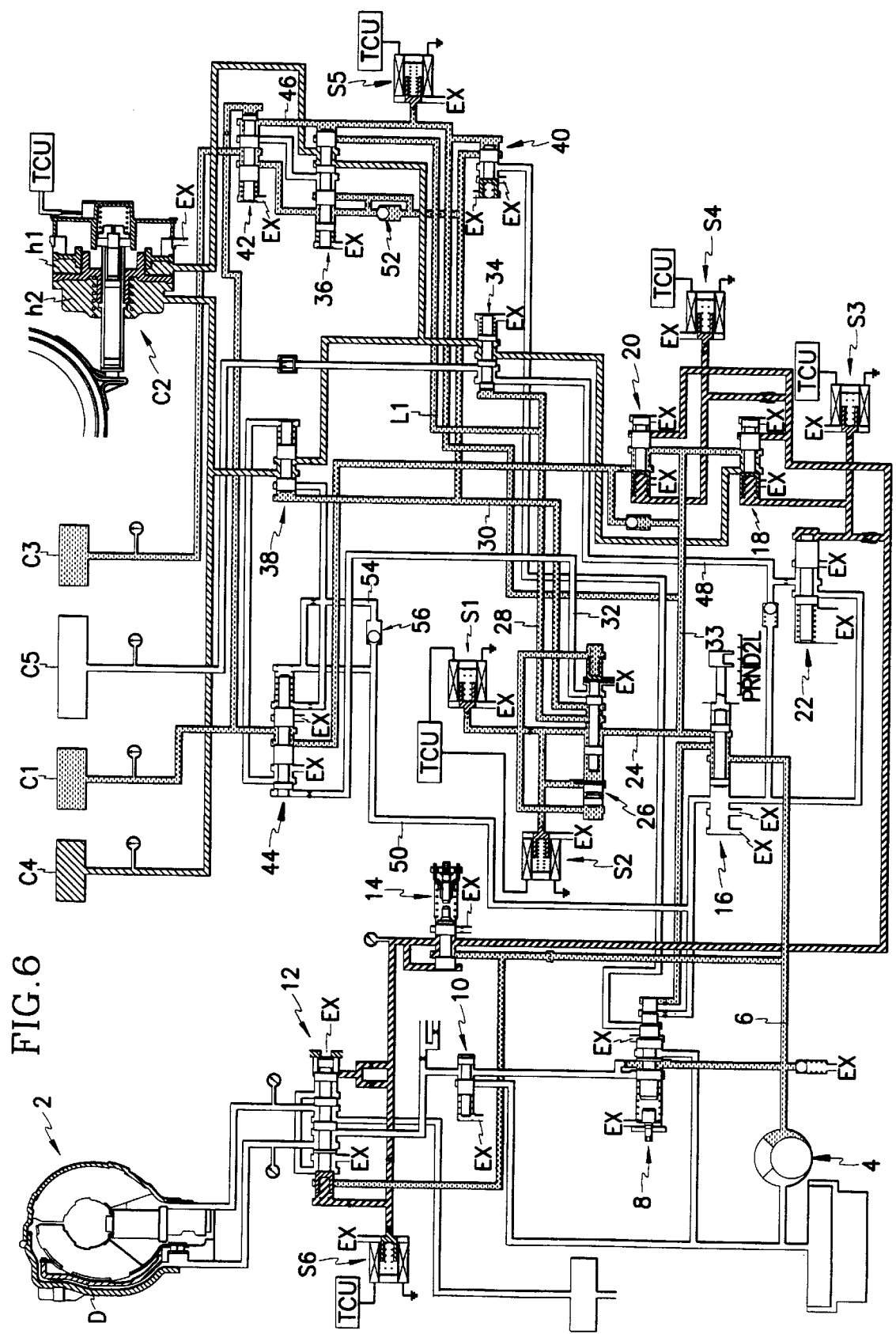
FIG. 6 is a hydraulic circuit diagram illustrating a hydraulic pressure flow state when upshifting from a second speed ratio to a third speed ratio in a drive "D" range of the hydraulic control system according to a preferred embodiment of the present invention.

As vehicle speed and throttle opening increase in the second speed ratio, as shown in FIG. 6, the first and second solenoid valves S1 and S2 are controlled to off states.

By this control, line pressure flows along the second and third speed lines 28 and 30 from the shift control valve 26.

At this point, line pressure within the third speed line 30 is directed to the 2-3/4-3 shift valve 38 as control pressure.

As a result, duty-controlled drive pressure standing by at the 2-3/4-3 shift valve 38 during the second speed ratio control is directed to both the disengaging chamber h2 of the second frictional element C2 and the fourth frictional element C4.

At this point, as the fifth solenoid valve S5 is controlled to an off state, duty-controlled drive pressure is supplied from the first pressure control valve 18 to the disengaging chamber h2 of the second frictional element C2 from the first pressure control valve 18 via the 1-2 shift valve 34 and the control switch valve 36, and part of the line pressure flowing along the second and third speed lines 28 and 30 stands by at the control switch valve 36.

In addition, part of the hydraulic pressure flowing along the timing control line 46 is fed to the high-low pressure valve 40 as control pressure such that part of the line pressure flowing along the third speed line 30 is interrupted.

Figure 7:
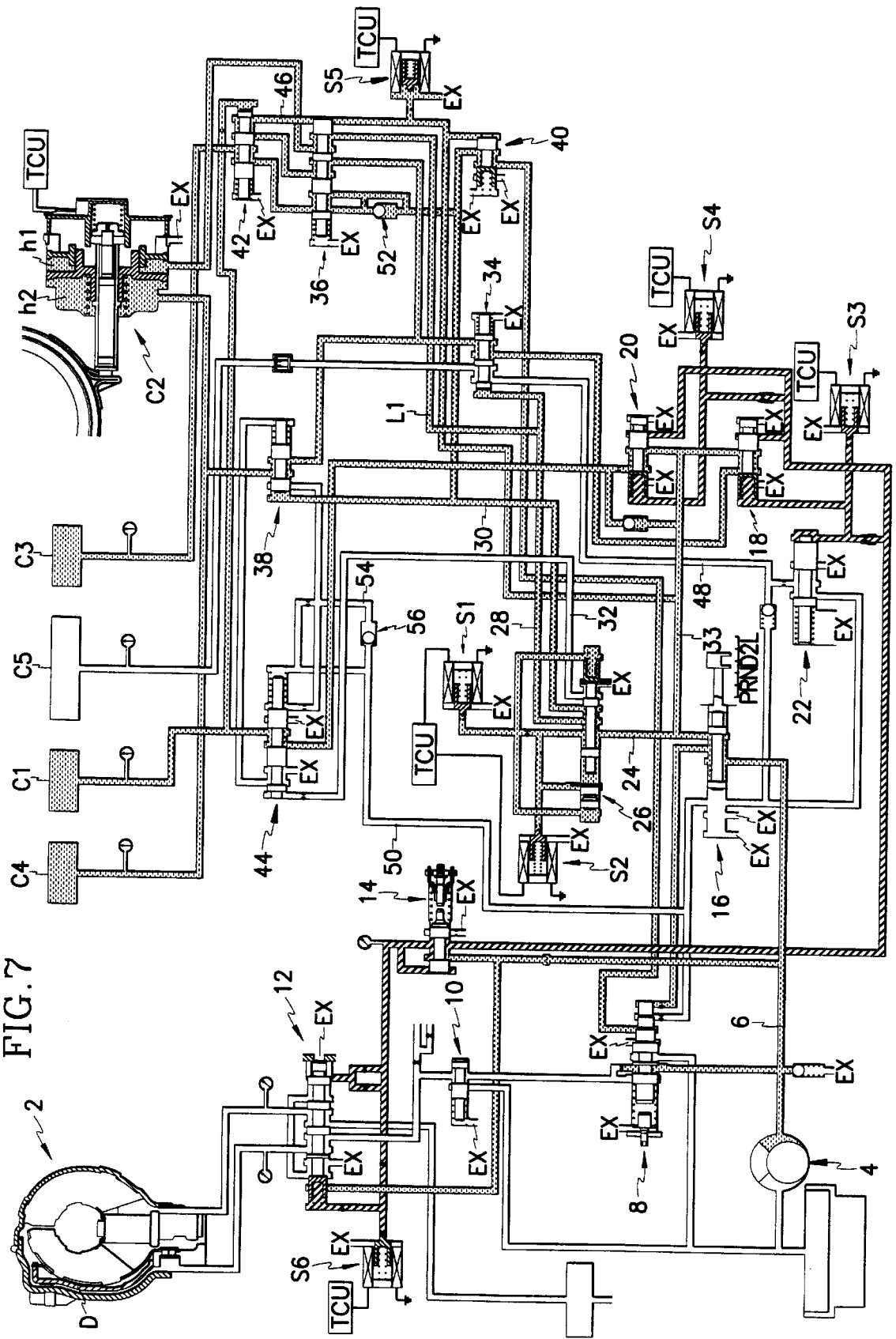
FIG. 7 is a hydraulic circuit diagram illustrating a hydraulic pressure flow state in a third speed ratio of a drive "D" range of the hydraulic control system according to a preferred embodiment of the present invention.

In this state, as shown in FIG. 7, when the fifth solenoid valve S5 is controlled to an on state, the control switch valve 36 is controlled such that duty-controlled drive pressure fed from the first pressure control valve 18 to the engaging chamber h1 of the second frictional element C2 is switched to line pressure fed from the shift control valve 26 through the second speed line 28, and at the same time, line pressure of the third speed line 30 is directed to the third frictional element C3, thereby completing the third speed ratio control.

During third speed ratio control, part of the line pressure directed towards the third frictional element C3 controls the pressure control valve 8 by being supplied thereto as control pressure via the high-low pressure valve 40.

Regulating of line pressure means that line pressure is reduced. The reduced line pressure makes it possible to reduce drive loss of the hydraulic pump 4 and improve the fuel consumption ratio in high speed ratios. As described above, in the present invention, line pressure is independently controlled by the solenoid valve while, in the prior art, line pressure is controlled by cooperation with the damper clutch.

In addition, at the end of the third speed ratio control, since the third frictional element C3 is substantially controlled by the operation of the fifth solenoid valve S5, during the shifting operation while driving, the transmission system is prevented from temporarily being controlled to the neutral state.

Figure 8:
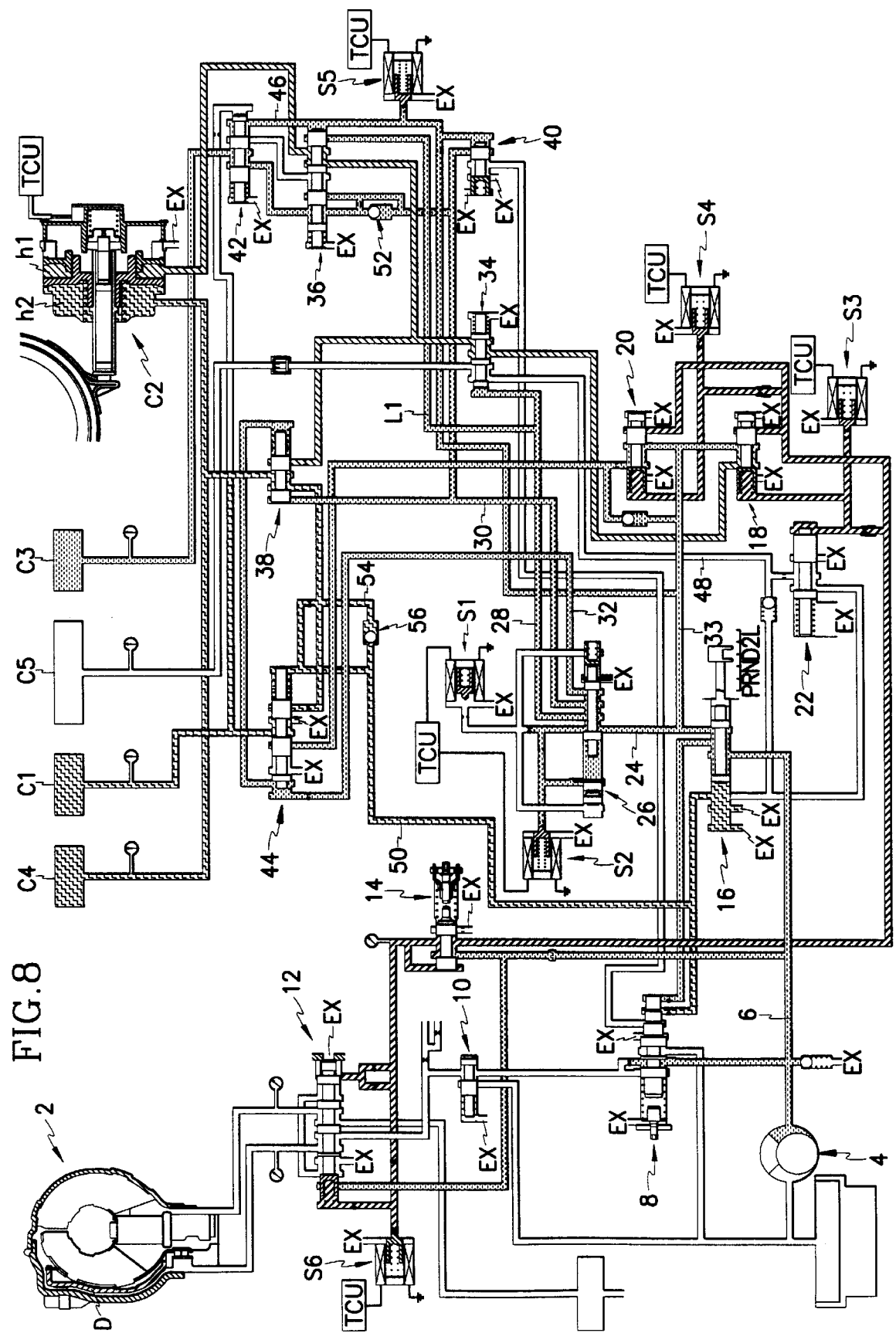
FIG. 8 is a hydraulic circuit diagram illustrating a hydraulic pressure flow state when upshifting from a third speed ratio to a fourth speed ratio in a drive "D" range of the hydraulic control system according to a preferred embodiment of the present invention.

As vehicle speed and throttle valve opening increase in the third speed ratio state, the transmission control unit controls, as shown in FIG. 8, the first solenoid valve S1 and the fifth solenoid valve S5 to on and off states, respectively, such that line pressure flows to the second, third and fourth speed lines 28, 30 and 32. In addition, the third solenoid valve S3 is duty-controlled to an off state.

Therefore, hydraulic pressure supplied to the engaging chamber h1 of the second frictional element C2 is switched to duty-controlled drive pressure from the first pressure control valve S3 by the operation of the control switch valve 36. The 3-4 shift valve and the 2-3/4-3 shift valve 44 are controlled by line pressure of the fourth speed line 32, such that hydraulic pressure fed to the first frictional element C1 in the third speed ratio is exhausted through an exhaust port of the 3-4 shift valve 44.

In addition, hydraulic pressure fed to the fourth frictional element C4 and the disengaging chamber h2 of the second frictional element C2 is exhausted through the manual valve 16 via the 2-3/4-3 shift valve 38 and the 3-4 shift valve 44 while being delayed by the check valve 56 disposed on the reverse second control line 50.

Figure 9:
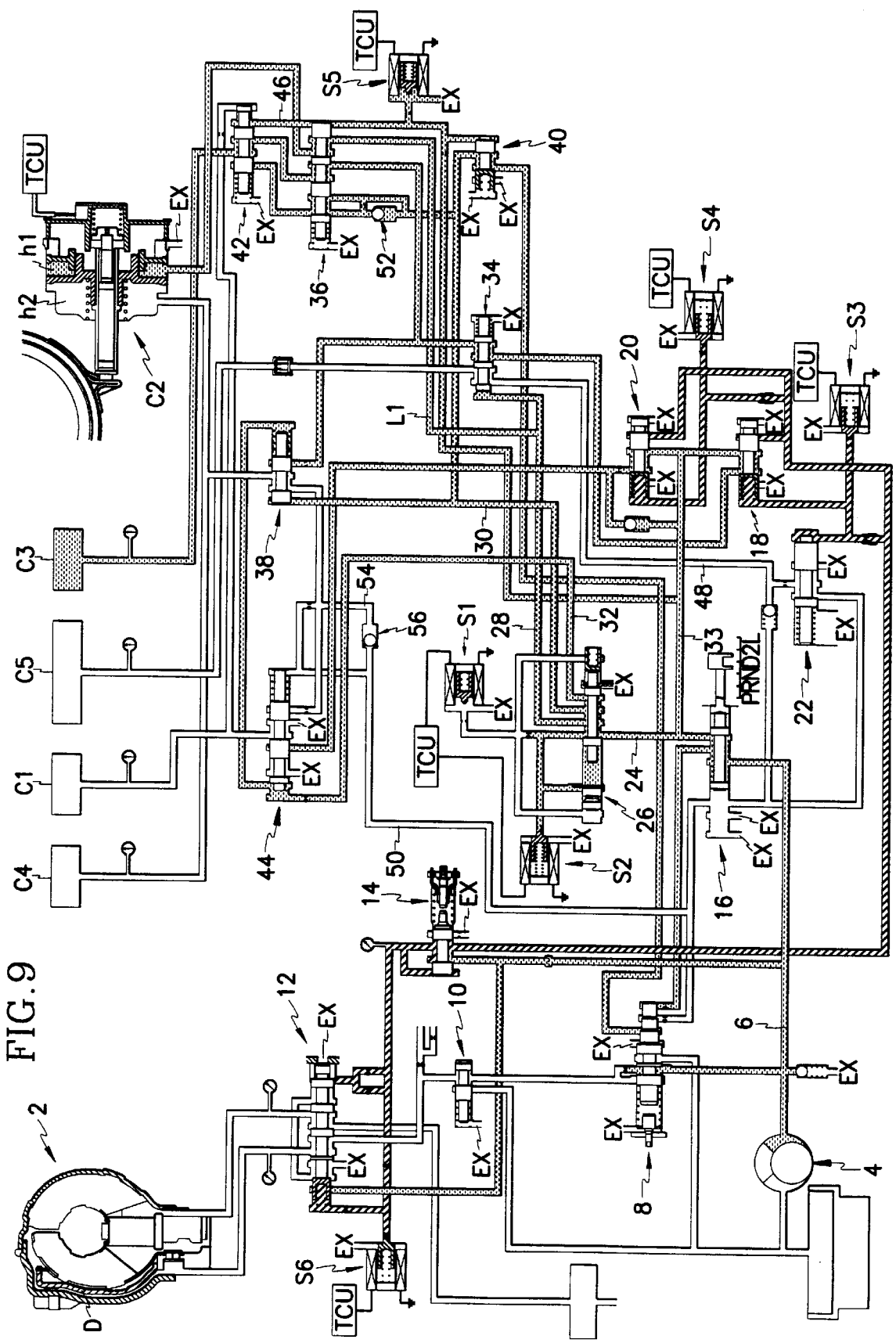
FIG. 9 is a hydraulic circuit diagram illustrating a hydraulic pressure flow state in a fourth speed ratio of a drive "D" range of the hydraulic control system according to a preferred embodiment of the present invention.

After completing the above control, as shown in FIG. 9, the fifth solenoid valve S5 is controlled to an on state so as to control the control switch valve 36 such that duty-controlled drive pressure is switched to line pressure fed from the shift control valve 26 to the second frictional element C2 and the engaging chamber h1 of the third frictional element C3, thereby completing the fourth speed ratio control.

Figure 10:
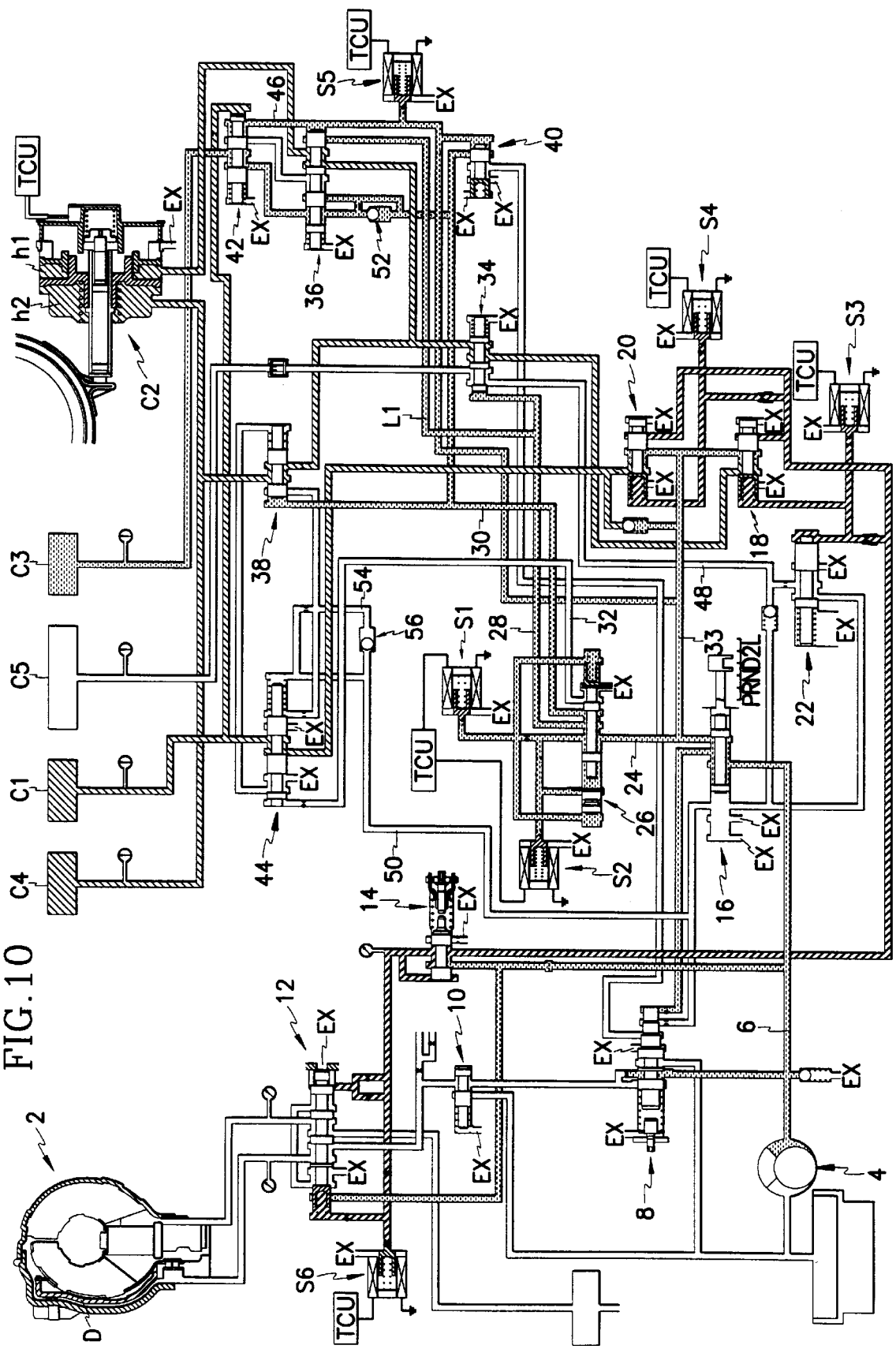
FIG. 10 is a hydraulic circuit diagram illustrating a hydraulic pressure flow state when downshifting from a fourth speed ratio to a third speed ratio in a drive "D" range of the hydraulic control system according to a preferred embodiment of the present invention.

When down-shifting from the fourth speed ratio to the third speed ratio, as shown in FIG. 10, the first solenoid valve S1 is controlled to an off state so that line pressure fed to the fourth speed line 32 is exhausted through the shift control valve 26. As a result, the 3-4 shift valve 44 is controlled such that hydraulic pressure fed to the 2-3/4-3 shift valve 38 is exhausted through an exhaust port of the 3-4 shift valve 44.

In addition, part of the duty-controlled drive pressure passing through the 1-2 shift valve 34 via the first pressure control valve 18 in accordance with the duty control of the third and fourth solenoid valves S3 and S4 is supplied to the engaging chamber h1 of the second frictional element C2 via the control switch valve 36 as the fifth solenoid valve is controlled to an off state, while the rest of the hydraulic pressure is directed to the disengaging chamber h2 of the second frictional element C2 and the fourth frictional element C4.

At this point, duty-controlled drive pressure controlled by the second pressure control valve 20 is fed to the first frictional element C1 via the 3-4 shift valve 44, thereby completing downshifting from the fourth speed ratio to the third speed ratio.

After completing downshifting to the third speed ratio, since the first frictional element C1 is disengaged, shift shock and temporary control into the neutral range state can be prevented.

Figure 11:
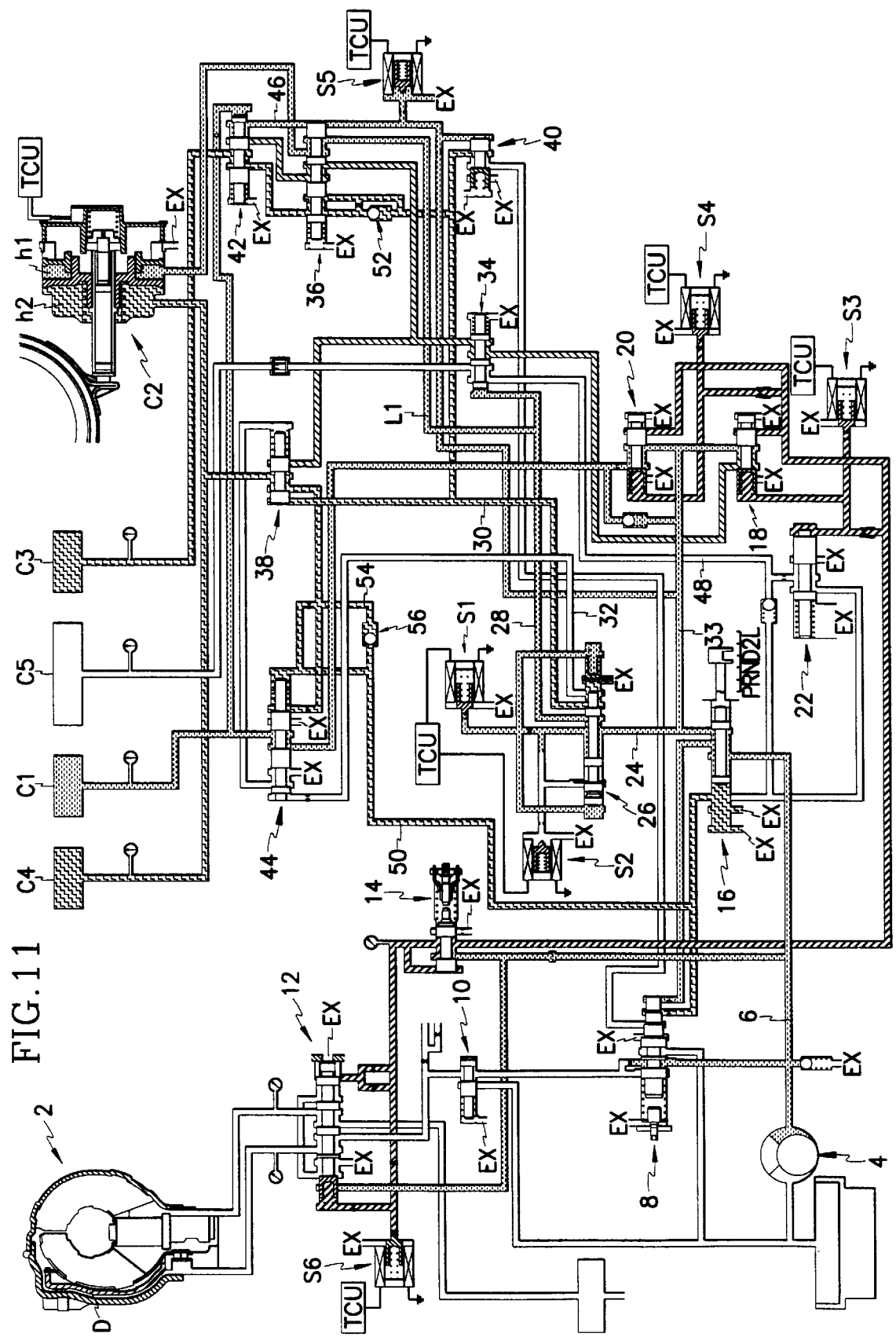
FIG. 11 is a hydraulic circuit diagram illustrating a hydraulic pressure flow state when downshifting from a third speed ratio to a second speed ratio in a drive "D" range of the hydraulic control system according to a preferred embodiment of the present invention.

When downshifting from the third speed ratio to the second speed ratio, as shown in FIG. 11, the second solenoid valve S2 is controlled to an on state so that line pressure directed to the third frictional element C3 is exhausted through the shift control valve 26.

In addition, the fifth solenoid valve S5 is controlled to an on state such that duty-controlled drive pressure supplied from the first pressure control valve 18 to the engaging chamber h1 of the second frictional element C2 is switched to line pressure from the shift control valve 26 by the operation of the control switch valve 36, and hydraulic pressure fed to the disengaging chamber h2 of the second frictional element C2 and the fourth frictional element C4 is exhausted through the manual valve 16 via the 2-3/4-3 shift valve 38, the 3-4 shift valve 44 and the reverse second control line 50.

Figure 12:
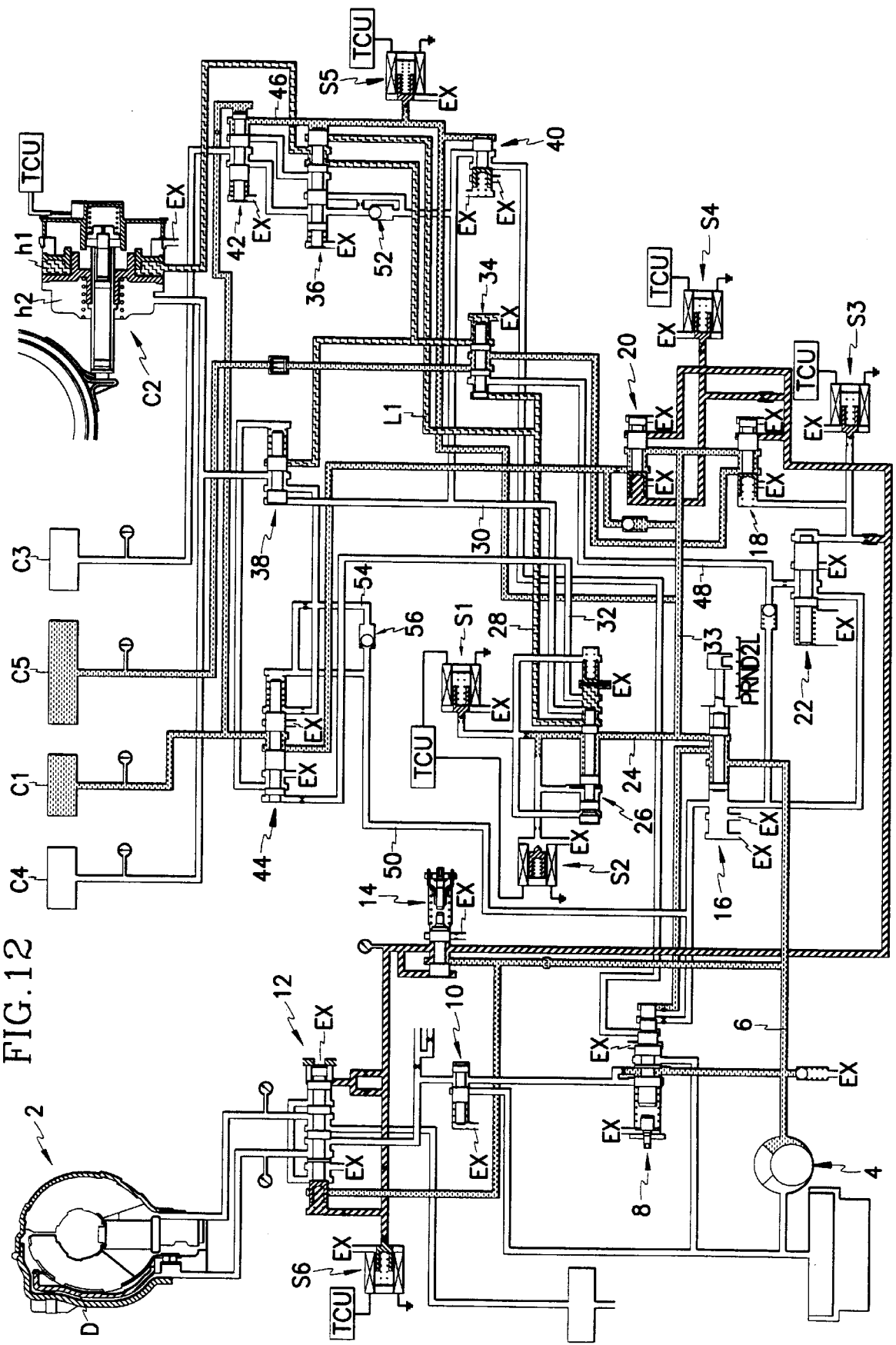
FIG. 12 is a hydraulic circuit diagram illustrating a hydraulic pressure flow state when downshifting from a second speed ratio to a first speed ratio in a drive "D" range of the hydraulic control system according to a preferred embodiment of the present invention.

When downshifting from the second speed ratio to the first speed ratio, as shown in FIG. 12, the first solenoid valve S1 is controlled to be maintained in an off state, the second solenoid valve S2 to an on state, and the fifth solenoid valve S5 to an off state during a shifting operation.

Therefore, hydraulic pressure fed to the second speed line 28 is rapidly exhausted through an exhaust port of the shift control valve 26, and hydraulic pressure directed to the engaging chamber h1 of the second frictional element C2 is exhausted through the 1-2 shift valve 34 via the control switch valve 36, thereby completing the 2-1 shift operation.

In the hydraulic control system as described above, it is possible to skipshift from the fourth speed ratio to the second speed ratio.

Figure 13:
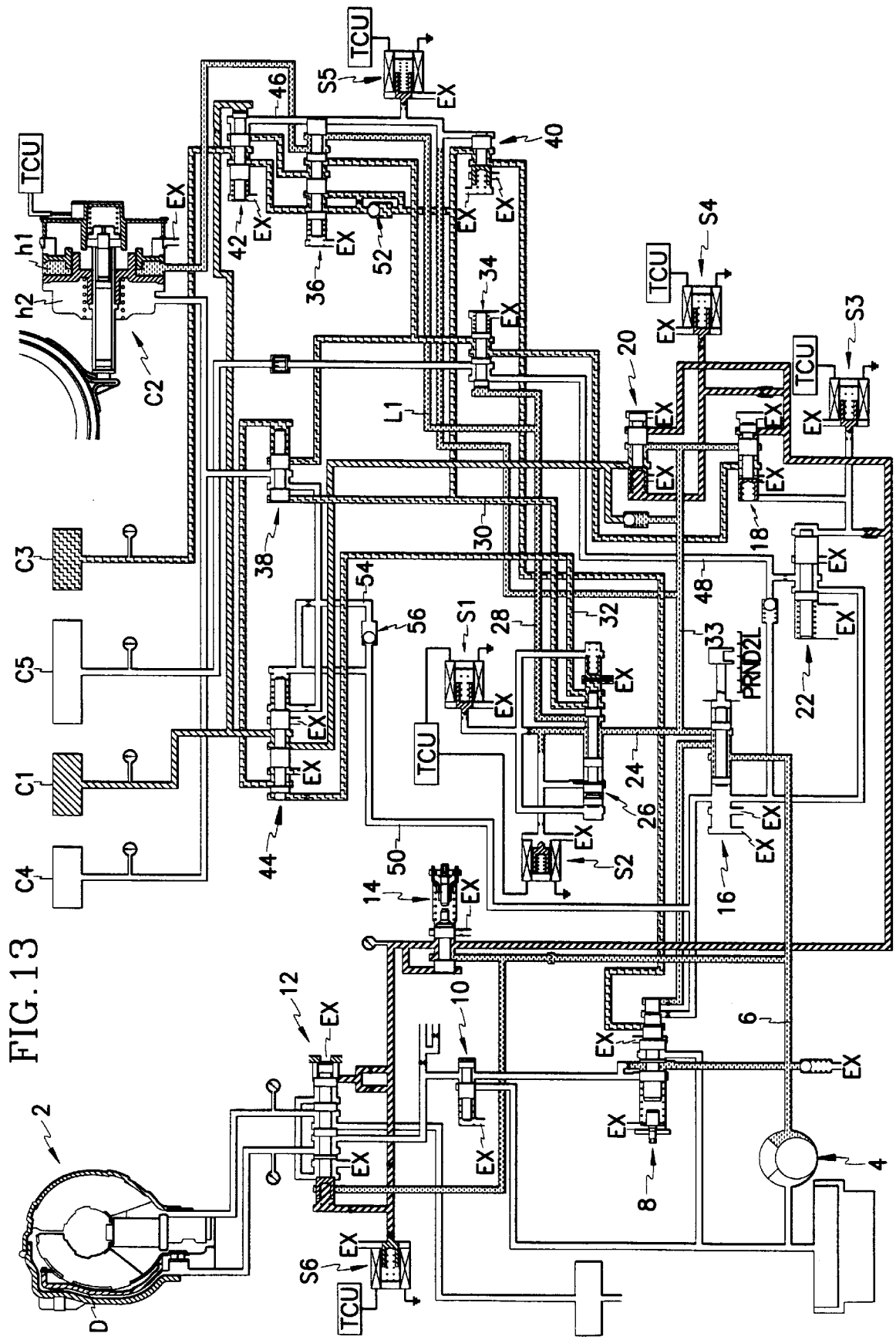
FIG. 13 is a hydraulic circuit diagram illustrating a hydraulic pressure flow state when skip upshifting from a fourth speed ratio to a second speed ratio in a drive "D" range of the hydraulic control system according to a preferred embodiment of the present invention.

That is, as shown in FIG. 13, when skipshifting from the fourth speed ratio to the second speed ratio, the first solenoid valve S1 is controlled to an off state, the second solenoid valve S2 to an on state, and the fifth solenoid valve S5 to an off state. The third and fourth solenoid valves S3 and S4 are duty-controlled.

Therefore, hydraulic pressure of the third frictional element C3 is exhausted while the first frictional element C1 is supplied with operating pressure, thereby completing a skip shifting operation to the second speed ratio in a clutch-to-clutch control manner. Clutch-to-clutch shifting improves shift quality.

While this invention has been described in connection with what is presently considered to be the most practical and preferred embodiment, it is to be understood that the invention is not limited to the disclosed embodiments, but, on the contrary, it is intended to cover various modifications and equivalent arrangements included within the spirit and scope of the appended claims.

What is claimed is:

1. A hydraulic control system for an automatic transmission including a plurality of frictional elements associated with respective transmission speeds, the hydraulic control system comprising:

a hydraulic fluid source;

line pressure/reducing pressure producing means for regulating hydraulic fluid produced in the hydraulic fluid source to line pressure and for reducing part of the line pressure;

shift control means for controlling shift mode; said shift control means being supplied with line pressure from line pressure/reducing pressure producing means;

hydraulic control means for converting line pressure fed from the shift control means into duty-controlled drive pressure or duty-controlled reverse pressure to improve shift quality and responsiveness, said hydraulic control means being supplied with the reduced line pressure from said line pressure/reducing pressure producing means as control pressure; and pressure distributing means for selectively distributing line pressure from the shift control means and duty-controlled drive or reverse pressure from the pressure control means to each frictional element for each speed ratio while being controlled by line pressure from the shift control means;

wherein said pressure distributing means comprises a control switch valve which supplies duty-controlled drive pressure from the pressure control means to one of frictional elements operated in fourth speed ratios as operating pressure during a shift control, and switches the duty-controlled drive pressure to line pressure from the shift control means after the shift control is completed, said control switch valve being controlled by line pressure supplied from the shift control means in accordance with an operation of a solenoid valve which is on/off controlled by a transmission control unit.

2. The hydraulic control system of claim 1, wherein said pressure distributing means further comprises:

a 1-2 shift valve for controlling a supply direction of duty-controlled reverse and drive pressures produced by the pressure control means, said 1-2 shift valve being controlled by line pressure from the shift control means;

a 4-2 shift valve for selectively supplying line pressure and duty-controlled drive pressure from the control switch valve to frictional elements which are operated in first, second and third speed ratios;

a 2-3/4-3 shift valve for selectively supplying line pressure from the shift control means and duty-controlled reverse pressure from the pressure control means to frictional elements which are operated in a third speed ratio and a reverse range, said 3-4 shift valve being controlled by line pressure from the shift control means; and a 3-4 shift valve for supplying duty-controlled drive pressure from the pressure control means to a frictional element which is operated in the first, second and third speed ratios, said 3-4 shift valve being controlled by line pressure from the shift control means and feeding this line pressure to the 2-3/4-3 shift valve as control pressure.

3. The hydraulic control system of claim 2, wherein the 1-2 shift valve comprises a first port for receiving control pressure from the shift control means; a second port for receiving hydraulic pressure duty-controlled by the pressure control means, a third port for receiving reverse pressure duty controlled by the pressure control means, a fourth port for simultaneously supplying the duty controlled pressure to the 2-3/4-3 shift valve and the control switch valve, and a fifth port for supplying the reverse pressure to the frictional element which is operated in the reverse range.

4. The hydraulic control system of claim 2, wherein the control switch valve comprises a first port for receiving line pressure from the shift control means as control pressure, a second port for supplying line pressure coming through the first port to the 4-2 shift valve, a third port for receiving line pressure from the shift control means, a fourth port for receiving duty-controlled drive pressure controlled by the pressure control means through the 1-2 shift valve, a fifth port for supplying line pressure coming through the third port or duty-controlled drive pressure coming through fourth ports to one of frictional elements in the second, third and fourth speed ratios as operating pressure, a sixth port for supplying duty-controlled drive pressure coming through the fourth port to the 4-2 shift valve, a seventh port for receiving line pressure from the shift control means, and an eighth port for directing line pressure coming through the seventh port to the 4-2 shift valve.

5. The hydraulic control system of claim 4, wherein the control switch valve further comprises a ninth port communicating with a first line branched off from a second line communicating with the seventh port, and a check valve that interrupts hydraulic pressure being directed to the control switch valve, said check valve being mounted on the first line.

6. The hydraulic control system of claim 2, wherein the 4-2 shift valve comprises a first port for receiving part of duty-controlled drive from the 3-4 shift valve, a second port for receiving line pressure from the control switch valve as control pressure, a third port for receiving line pressure or duty-controlled drive pressure from the control switch valve, a fourth port for receiving line pressure from the control switch valve, and a fifth port for selectively supplying line pressure and duty-controlled drive pressure coming through the third and fourth ports to a frictional element operated in the third and fourth speed ratios.

7. The hydraulic control system of claim 2, wherein the 2-3/4-3 shift valve comprises a first port for receiving line pressure from the shift control means as control pressure, a second port connected to the 3-4 shift valve to receive line pressure therefrom, a third port connected to a frictional element for the third speed ratios, a fourth port for receiving line pressure from the 3-4 shift valve and feeding line pressure to the frictional element for the third speed through the third port, and a fifth port for receiving duty-controlled drive pressure from the pressure control means via the 1-2 shift valve.

8. The hydraulic control system of claim 2, wherein the 3-4 shift valve comprises a first port for receiving line pressure from the shift control means, a second port for supplying line pressure coming through the first port to the second port of the 2-3/4-3 shift valve as control pressure, a third port for receiving duty-controlled drive pressure from the second pressure control valve, a fourth port for supplying duty-controlled drive pressure coming through the third port to the frictional element for first, second and third speed ratios, and fifth and sixth ports for receiving line pressure from the shift control means.

9. The hydraulic control system of claim 8, wherein a circulating line is branched off and communicating with a first line connected to the sixth port of the 3-4 shift valve, the fifth port being connected to a second line branched off from the circulating line and the second line extending to the 2-3/4-3 shift valve.

10. The hydraulic control system of claim 1, wherein the line pressure/reducing pressure producing means comprises a pressure regulating valve for regulating hydraulic fluid produced in the hydraulic fluid source to line pressure and a reducing valve for reducing part of the line pressure.

11. The hydraulic control system of claim 10, wherein the shift control means comprises a manual valve for selecting a shift mode, said manual valve being connected to the pressure regulating valve to be supplied with line pressure therefrom, and a shift control valve for receiving line pressure from the manual valve and supplying line pressure to the pressure dispensing means as operating pressure and control pressure.

12. The hydraulic control system of claim 10, wherein the pressure control means comprises a N-R control valve for receiving line pressure reduced in the reducing pressure as control pressure and line pressure from the manual valve as line pressure and for supplying line pressure to the pressure dispensing means as reverse pressure, and a first pressure control valve for receiving line pressure reduced in the reducing pressure as control pressure and line pressure from the manual valve and for supplying line pressure to the pressure dispensing means as operating pressure, and a second pressure control valve for receiving line pressure reduced in the reducing pressure as control pressure and line pressure from the manual valve and for supplying line pressure to the pressure dispensing means.

13. The hydraulic control system of claim 1, wherein the pressure control means is controlled by first and second duty-controlled solenoid valves.

* * * * *